US009884362B2

(12) United States Patent
Mautino et al.

(10) Patent No.: US 9,884,362 B2
(45) Date of Patent: Feb. 6, 2018

(54) METHOD AND SYSTEM FOR MANUFACTURING A WHEEL

(75) Inventors: Peter S. Mautino, Pittsburgh, PA (US); Anthony J. Sicilia, McKees Rocks, PA (US)

(73) Assignee: McConway & Torley LLC, Dallas, TX (US)

( * ) Notice: Subject to any disclaimer, the term of this patent is extended or adjusted under 35 U.S.C. 154(b) by 456 days.

(21) Appl. No.: 13/345,353

(22) Filed: Jan. 6, 2012

(65) Prior Publication Data

US 2012/0175905 A1   Jul. 12, 2012

Related U.S. Application Data

(60) Provisional application No. 61/430,738, filed on Jan. 7, 2011.

(51) Int. Cl.
*B22C 9/02* (2006.01)
*B22C 9/08* (2006.01)
(Continued)

(52) U.S. Cl.
CPC .................. *B22C 9/02* (2013.01); *B22C 9/08* (2013.01); *B22C 9/28* (2013.01); *B60B 3/06* (2013.01);
(Continued)

(58) Field of Classification Search
CPC ................ B22C 9/02; B22C 9/08; B22C 9/28
(Continued)

(56) References Cited

U.S. PATENT DOCUMENTS 106,243 A    8/1870  Wilmington
1,025,438 A    5/1912  West
(Continued)

FOREIGN PATENT DOCUMENTS

CN    1693015 A    11/2005  ............. B22D 18/02
CN    101234410    8/2008  ............... B22C 9/28
(Continued)

OTHER PUBLICATIONS

International Search Report and Written Opinion; PCT/US2012/020485; pp. 10, dated Apr. 19, 2012.
(Continued)

*Primary Examiner* — Kevin P Kerns
(74) *Attorney, Agent, or Firm* — Baker Botts, LLP

(57) ABSTRACT

A system for manufacturing a wheel includes a cope mold portion with internal cope mold walls and a drag mold portion with internal drag mold walls. The internal cope mold walls and internal drag mold walls define at least in part perimeter boundaries of a wheel cavity. The wheel cavity includes a cavity center portion configured to form a wheel center portion of a wheel after solidification of a molten alloy in the cavity center portion, a cavity plate portion configured to form a wheel plate portion of the wheel after solidification of a molten alloy in the cavity plate portion, and a cavity flange portion configured to form a wheel flange portion of the wheel after solidification of a molten alloy in the cavity flange portion. The system includes a chill component positioned within the wheel cavity adjacent the cavity flange portion. The chill component is configured to provide directional solidification from the cavity flange portion toward the cavity plate portion of molten alloy in the wheel cavity.

11 Claims, 4 Drawing Sheets

(51) Int. Cl.
*B22C 9/28* (2006.01)
*B60B 3/06* (2006.01)
*B60B 17/00* (2006.01)

(52) U.S. Cl.
CPC .......... *B60B 17/00* (2013.01); *B60B 17/0068* (2013.01); *B60B 2310/202* (2013.01); *B60B 2900/112* (2013.01); *B60B 2900/325* (2013.01); *B60Y 2200/33* (2013.01)

(58) Field of Classification Search
USPC ....... 164/349, 352, 353, 354, 356, 364, 365, 164/371
See application file for complete search history.

(56) References Cited

U.S. PATENT DOCUMENTS

| | | | |
|---|---|---|---|
| 1,161,034 A | | 11/1915 | Davis |
| 1,908,740 A | * | 5/1933 | Fahrenwald ............ B60B 17/00 164/127 |
| 1,908,741 A | | 5/1933 | Fahrenwald |
| 1,943,434 A | | 1/1934 | Hempstead et al. ............ 22/131 |
| 2,886,865 A | * | 5/1959 | Leisk ....................... B22C 9/068 164/22 |
| RE24,655 E | * | 6/1959 | Sylvester ................ B22C 9/088 164/27 |
| 3,433,293 A | * | 3/1969 | Ponzar ........................... 164/358 |
| 3,480,070 A | | 11/1969 | Beetle et al. |
| 4,961,460 A | | 10/1990 | Butler et al. ................... 164/134 |
| 5,503,214 A | * | 4/1996 | Cribley et al. ................. 164/134 |
| 7,017,647 B2 | * | 3/2006 | Bland ........................... 164/137 |

FOREIGN PATENT DOCUMENTS

| | | | |
|---|---|---|---|
| CN | 101244449 | 8/2008 | |
| DE | 8900819 | 1/1989 | .............. B22C 9/08 |
| JP | 58-084639 | 5/1983 | |
| RU | 50890 | 1/2006 | |
| SU | 1371759 | 8/1986 | |
| SU | 1660832 | 1/1988 | |
| SU | 1740101 | 4/1990 | |

OTHER PUBLICATIONS

International Preliminary Report on Patentability; PCT/US2012/020485; pp. 6, dated Jul. 10, 2013.
First Office Action of the Chinese Patent Office with English Translation; Application No. 201280004680.3, dated Sep. 11, 2014.
First Office Action of the Australian Application 2012204211, dated Nov. 28, 2014.
Ukrainian Office Action; Appl. No. a 2013 08442/M; 4 pages (w/ English Translation), dated Feb. 20, 2015.
Chinese Office Action; Appl. No. 201280004680.3; (w/ English Translation), dated Jul. 8, 2015.
Official Action of the Substantive Examination issued by the Federal Agency for Intellectual Property/Federal Institute of Industrial Property (FIIP) for Application No. 2013130655/02 (045791) dated Dec. 16, 2015 (English translated attached).
Taiwanese Office Action/Search Report issued for Application No. 101100615—dated Jul. 26, 2016.
Office Action issued by the Examiner of the Intellectual Property Office (the IPO) for Taiwan Patent Appiication No. 106103524—dated Nov. 29, 2017.

* cited by examiner

METHOD AND SYSTEM FOR MANUFACTURING A WHEEL

RELATED APPLICATION

This application claims priority from U.S. Provisional Application No. 61/430,738, filed Jan. 7, 2011, entitled Method and System for Manufacturing a Wheel.

TECHNICAL FIELD

The present disclosure is related to wheels, and more particularly to methods and systems for manufacturing a wheel, such as a railcar wheel.

BACKGROUND

Conventional methods of manufacturing railcar wheels have included graphite molds into which a molten alloy is poured for casting the wheel. A sand liner in the graphite mold may act as an insulator in order to provide desired solidification. The sand liner can produce inconsistencies if it moves in the mold. The use of graphite molds can also be very expensive in the manufacturing process.

SUMMARY

The teachings of the present disclosure relate to a system and a method for manufacturing a wheel. In accordance with one embodiment, a system for manufacturing a wheel includes a cope mold portion comprising internal cope mold walls and a drag mold portion comprising internal drag mold walls. The internal cope mold walls and internal drag mold walls define at least in part perimeter boundaries of a wheel cavity. The wheel cavity comprises a cavity center portion configured to form a wheel center portion of a wheel after solidification of a molten alloy in the cavity center portion, a cavity plate portion configured to form a wheel plate portion of the wheel after solidification of a molten alloy in the cavity plate portion, and a cavity flange portion configured to form a wheel flange portion of the wheel after solidification of a molten alloy in the cavity flange portion. The system includes a chill component positioned within the wheel cavity adjacent the cavity flange portion. The chill component is configured to provide directional solidification from the cavity flange portion toward the cavity plate portion of molten alloy in the wheel cavity.

According to another embodiment, a method is provided for manufacturing a wheel comprising positioning a chill component within a wheel cavity. The wheel cavity includes perimeter boundaries defined at least in part by internal cope mold walls of a cope mold portion and internal drag mold walls of a drag mold portion. The wheel cavity comprises a cavity center portion configured to form a wheel center portion of a wheel after solidification of a molten alloy in the cavity center portion, a cavity plate portion configured to form a wheel flange portion of the wheel after solidification of a molten alloy in the cavity flange portion, and a cavity flange portion configured to form a wheel flange portion of the wheel after solidification of a molten alloy in the cavity flange portion. The chill component is configured to provide directional solidification from the cavity flange portion toward the cavity plate portion of molten alloy in the wheel cavity. The method includes closing the cope and drag mold portions with the chill component positioned in the wheel cavity, and at least partially filling the wheel cavity with a molten alloy. The molten alloy solidifies to form the wheel.

Technical advantages of particular embodiments may include using a green sand mold which can reduce manufacturing costs. Another technical advantage of particular embodiments is the use of a chill around a flange portion of the mold cavity to provide desired directional solidification of the molten alloy in the cavity. An additional technical advantage of particular embodiments is the use of a tile basin, one or more filters, or both in combination to remove inclusions from the molten alloy. Using a tile basin, one or more filters, or both may also reduce turbulence in the molten alloy as it enters the casting cavity. Another technical advantage of some embodiments is the use of risers adjacent to the cavity flange portion of the wheel cavity to reduce porosity in the wheel flange portion. In particular embodiments, a riser breaker core may be positioned adjacent a riser to reduce the diameter of the riser at the point of attachment with the cast wheel, which may facilitate removal of the riser.

Other technical advantages will be readily apparent to one of ordinary skill in the art from the following figures, descriptions, and claims. Moreover; while specific advantages have been enumerated above, various embodiments may include all, some, or none of the enumerated advantages.

BRIEF DESCRIPTION OF THE DRAWINGS

A more complete understanding of particular embodiments will be apparent from the detailed description taken in conjunction with the accompanying drawings in which.

DETAILED DESCRIPTION

Figure 1:
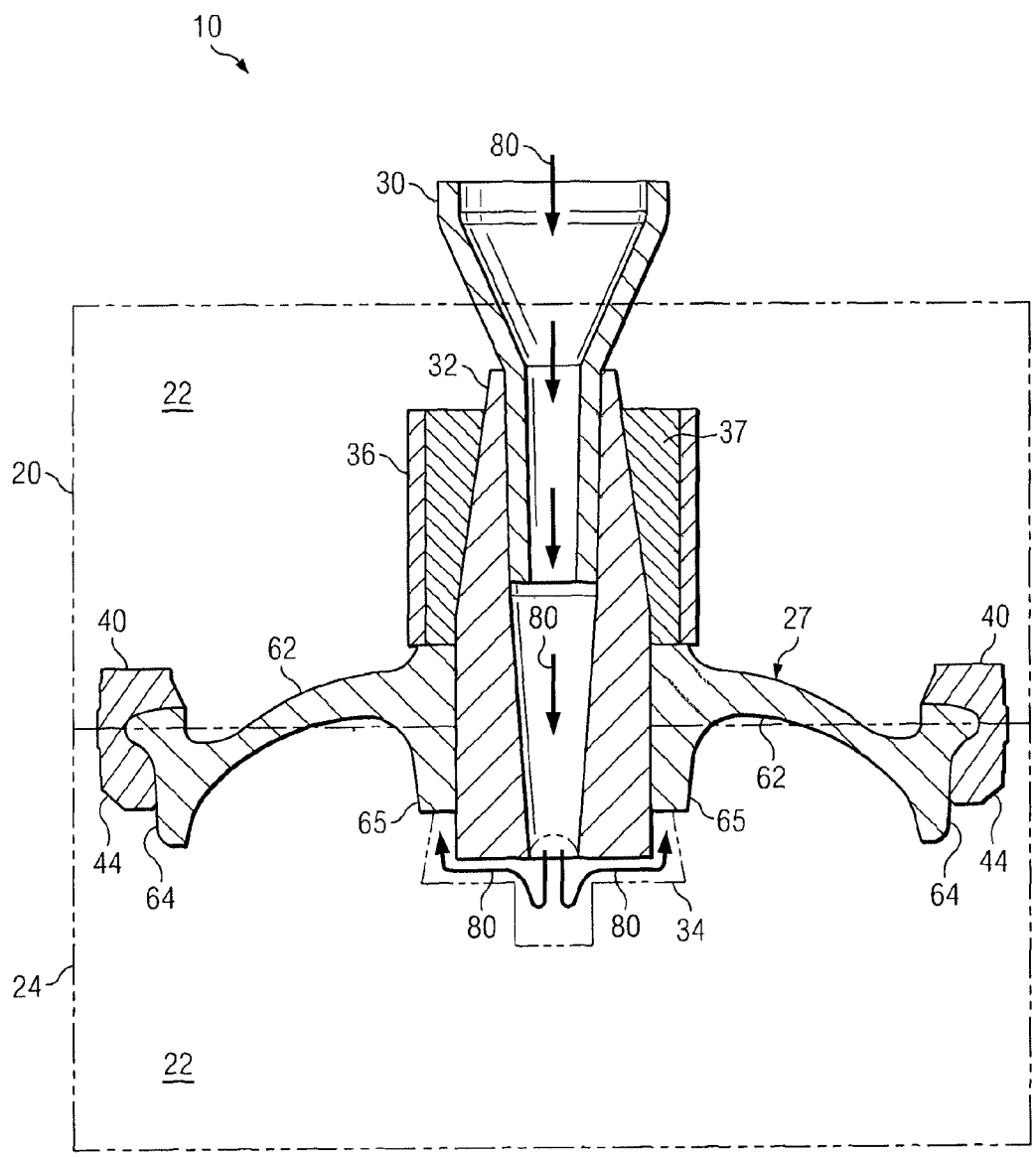
FIG. 1 is a cross-sectional view of a wheel manufacturing assembly, in accordance with particular embodiments.

FIG. 1 is a cross-sectional view of a wheel manufacturing assembly, in accordance with particular embodiments. Manufacturing assembly 10 includes a cope mold 20 and a drag mold 24 into which a molten alloy, such as liquid steel, is poured in order to manufacture a cast railcar wheel. The cope and drag molds include a casting cavity 27 created when the cope and drag molds are aligned and closed together. The internal walls of casting cavity 27 may be formed using a pattern and a high-pressure process to create the cavity in the molds. The walls define at least in part the surfaces of the cavity into which the molten alloy is poured and solidifies for manufacturing the wheel. In the illustrated embodiment, cope mold 20 and drag mold 24 both comprise green sand 22, which may include a combination of sand, water, and/or clay. Green sand 22 may be considered green because it is not baked in some embodiments (e.g., there is no chemical bonding and it is not heated or treated). Other embodiments may utilize other suitable materials, such as other types of sand, to make up the cope and drag molds. The casting cavity formed in cope mold 20 and drag mold 24 includes plate portion 62 for forming the plate section of the wheel, flange portion 64 for forming the flange section of the wheel, and center portion 65 for forming the center section of the wheel.

Manufacturing assembly 10 also includes a sprue 30, a core 32, a riser sleeve 36, gating section 34, a cope chill 40, and a drag chill 44. Sprue 30 receives the molten alloy for the railcar wheel. Sprue 30 is supported by the cope and drag molds and may not be supported by core 32 in particular embodiments. Core 32 comprises a resin-bound sand in particular embodiments. Core 32 is used to form the center circular cavity in the wheel when the molten alloy solidifies around the core. Riser sleeve 36 insulates a riser portion 37 that is formed from solidification of the liquid alloy after it flows down through the lower cope and drag mold cavities. Gating section 34 is built into drag mold 24 using a pattern and receives the liquid alloy as it flows down through sprue 30 and into casting cavity 27 created by cope mold 20 and drag mold 24. In particular embodiments, gating section 34 may include four ingates, each about 90 degrees apart, through which a liquid metal or alloy may enter casting cavity 27. The illustrated embodiment utilizes a top gating system allowing the molten alloy to enter at the top of assembly 10 to promote directional solidification from bottom to top of the casting. Other embodiments may use other types of gating systems.

Cope chill 40 and drag chill 44 are generally circular and surround the flange portions 64 of the cope and drag mold cavities. In particular embodiments, the chills may comprise one piece or two halves, one half in the cope mold and the other half in the drag mold. The two halves may be connected by pins and bushings (or other suitable components) and set into the drag mold as one piece. The chills may be made of steel, graphite, or other suitable metal or material. The chills assist in providing a desired directional solidification by helping to ensure that the liquid alloy solidifies from the outside of the cavities (e.g., the flange portion) towards the inside (e.g., towards the plate portion). If the plate portion of the wheel were to solidify before the flange portion, then a hot spot would be isolated in the flange portion of the wheel and an undesirable hole may be created in the casting. Some conventional methods of manufacturing a railcar wheel use graphite cope and drag molds with a sand liner to act as an insulator because the graphite molds act as a chill. However, this method can provide for an inconsistent casting. The use of green sand with a metal or graphite chill only at the flange portions of the cavity increases the likelihood of a consistent casting. In addition, the fact that the casting cavity is created by the pattern in green sand (as opposed to utilizing a liner placed into a cavity) reduces inconsistencies because the cavity will be maintained and there is no handling of another component that could create inconsistencies. In particular embodiments, the chills used may be permanent in the molds and reusable for casting multiple wheels in the same molds.

When manufacturing the cast wheel, the molten alloy flows down through sprue 30 and enters casting cavity 27 after flowing through ingates of gating system 34, as depicted by arrows 80 in FIG. 1. The alloy flows out to flange portion 64 of the casting cavity and back up through riser sleeve 36. Because of cope chill 40 and drag chill 44, the molten alloy solidifies first in the flange portion, and then solidifies from an outside to inside direction. The casting may be machined in the manufacturing process to complete the wheel. For example, metal riser portion 37 that remains after the solid metal is removed from the mold may be machined away in particular embodiments.

Figure 2:
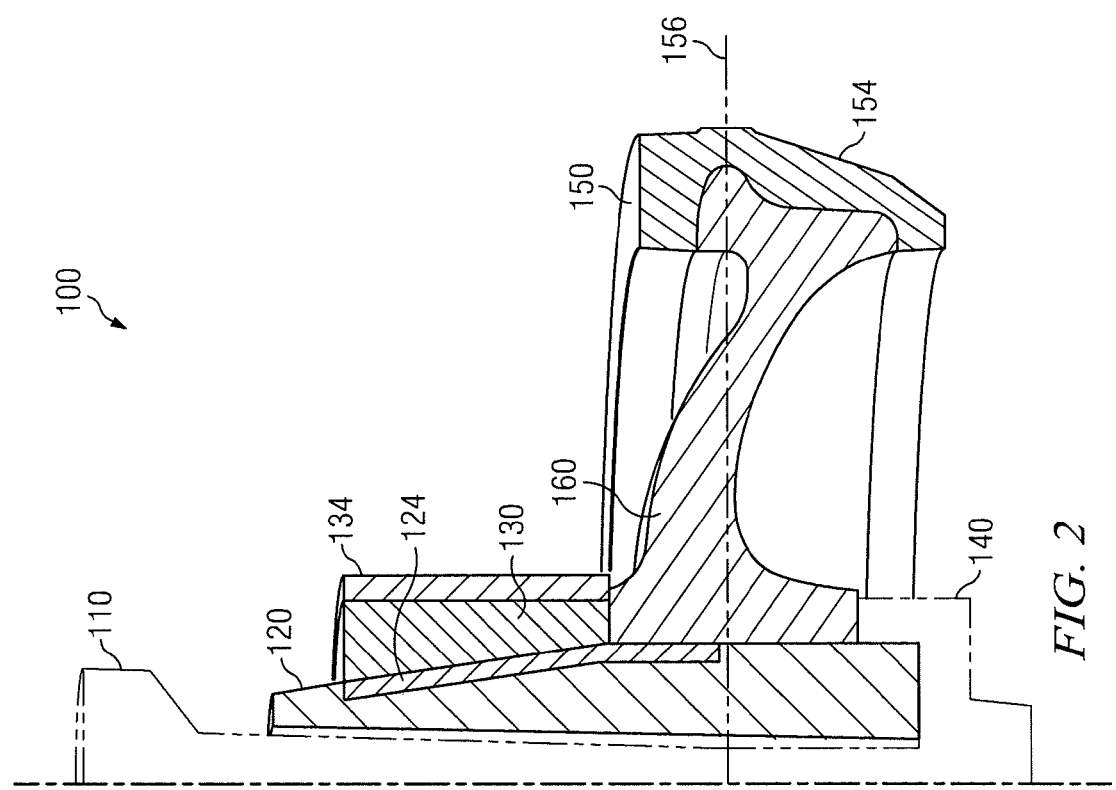
FIG. 2 is a partial perspective view of components of a wheel manufacturing assembly, in accordance with particular embodiments.

FIG. 2 is a partial perspective view of components of a wheel manufacturing assembly, in accordance with particular embodiments. Wheel manufacturing assembly 100 of FIG. 2 is similar to wheel manufacturing assembly 10 of FIG. 1. Wheel manufacturing assembly 100 includes sprue 110 inserted into core 120. In some embodiments, sprue 110 is supported by cope and drag molds, and in other embodiments sprue 110 may contact and/or be supported by molded tile of the inside wall of the inside cylindrical cavity of core 120. In this embodiment, a riser sleeve 124 insulates core 120 from the molten alloy after it flows through the casting cavity. Another riser sleeve 134 contains riser metal 130, which may be machined away after casting in particular embodiments. Assembly 100 also includes ingate 140, which may be one of a number of ingates created in the drag mold (e.g., four in some embodiments) through which the molten alloy flows into the casting cavity. The chill is illustrated in a cope half 150 and a drag half 154. The solidification of the molten alloy forms wheel casting 160. Line 156 illustrates the parting line formed between the cope and drag molds.

Figure 3:
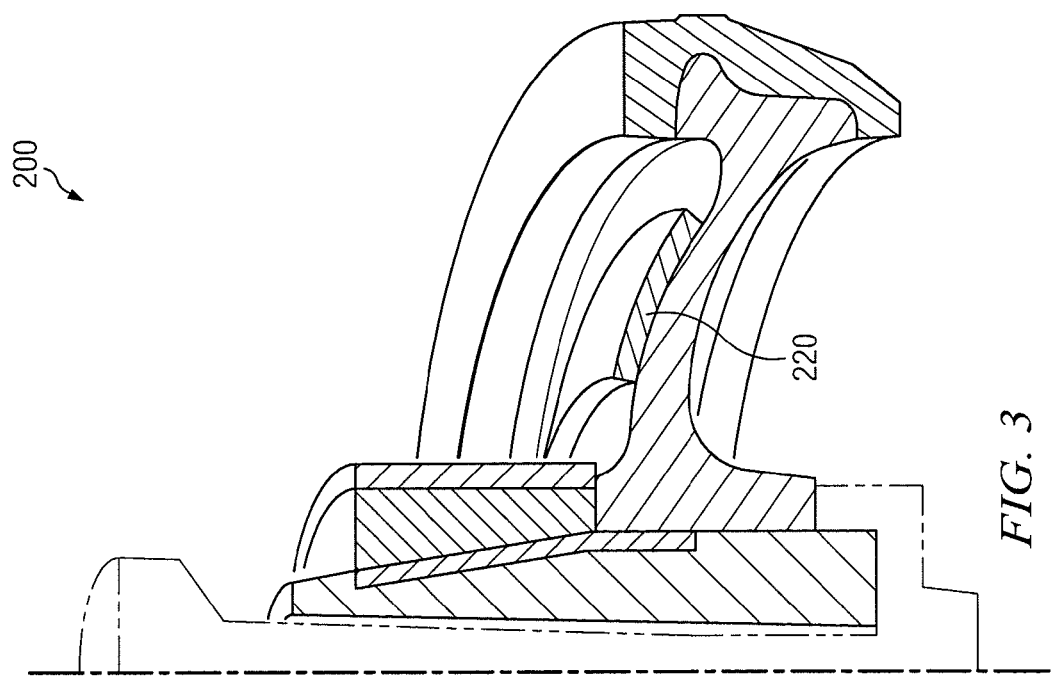
FIG. 3 is another partial perspective view of components of a wheel manufacturing assembly, in accordance with particular embodiments.

FIG. 3 is another partial perspective view of components of a wheel manufacturing assembly, in accordance with particular embodiments. Manufacturing assembly 200 of FIG. 3 is similar to manufacturing assemblies 10 and 100 of FIGS. 1 and 2, respectively, but also includes an additional sleeve 220 for insulation of the plate portion of the wheel casting to help ensure that the plate portion solidifies before the inner portions of the casting (but after the outer flange portions).

Figure 4:
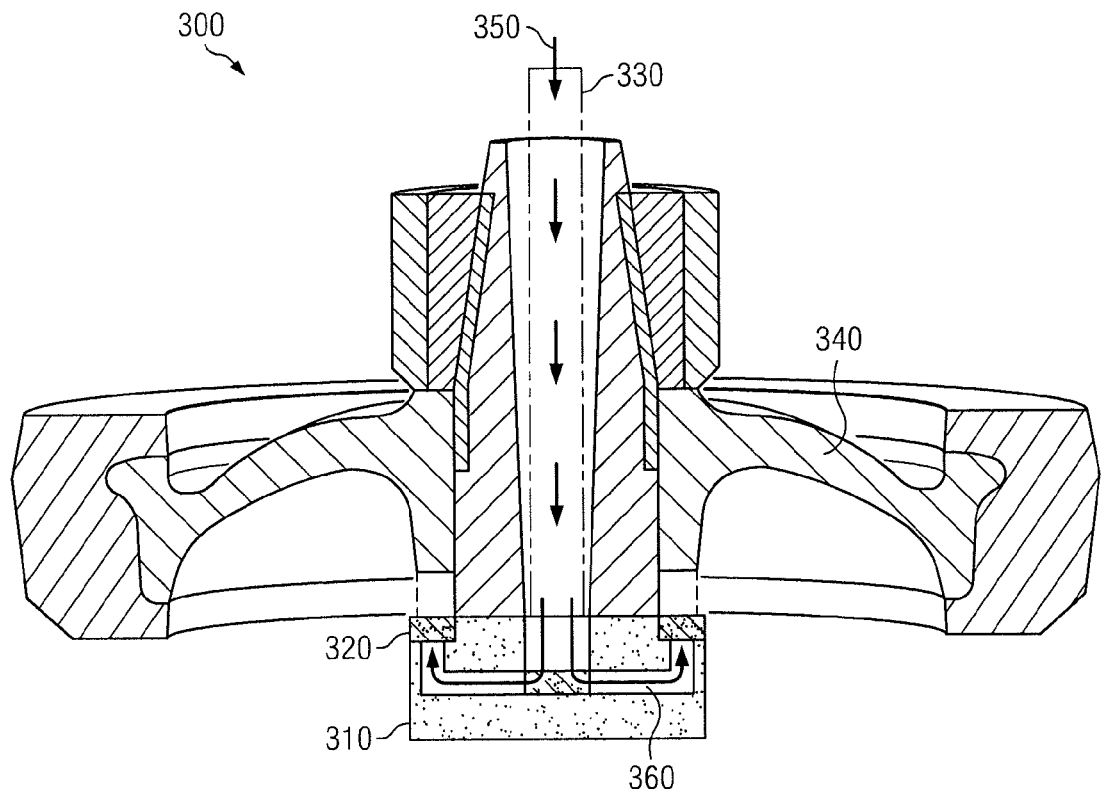
FIG. 4 is another partial perspective view of components of a wheel manufacturing assembly, in accordance with particular embodiments.

FIG. 4 is another partial perspective view of components of a wheel manufacturing assembly, in accordance with particular embodiments. Manufacturing assembly 300 of FIG. 4 is similar to manufacturing assemblies 10, 100, and 200 of FIGS. 1, 2, and 3, respectively, but also includes a tile basin 310 and filters 320. Tile basin 310 is built into the drag mold and receives the molten alloy as it flows down through sprue 330, as depicted by arrows 350, and into casting cavity 340 created by the cope and drag molds.

Tile basin 310 comprises ingates 360 through which the molten alloy enters the casting cavity. In particular embodiments, tile basin 310 is constructed from one or more ceramic tiles. Tile basin 310 helps to prevent erosion in the drag mold and assists in providing a desired laminar flow of the molten alloy as it enters the casting cavity. In an embodiment without a tile basin, the pressure and velocity of the molten alloy as it enters the sprue and proceeds toward the casting cavity may result in increased turbulent flow and inclusions in the alloy.

Filters 320 help to reduce inclusions carried by the molten alloy and turbulence as the molten alloy enters the casting cavity. Filters 320 are designed to withstand the temperature of the molten alloy. In some embodiments tile basin 310 houses a filter located directly in-line with sprue 330. In particular embodiments a filter is housed directly adjacent each ingate comprising ingates 360. In some embodiments the tile basin houses a filter in-line with sprue 330 and filters adjacent ingates 360. The tile basin may also house filters 320 in an alternative configuration. Various embodiments may utilize any number of filters in any particular position or configuration. Filters used in some embodiments may comprise a styrofoam or sponge-like material and may be any suitable shape or configuration.

Figure 5:
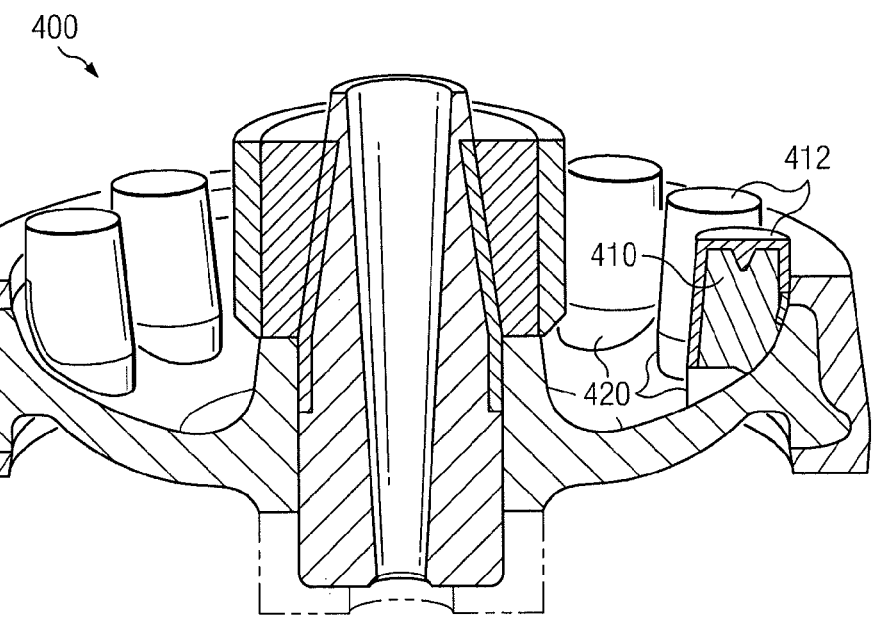
FIG. 5 is another partial perspective view of components of a wheel manufacturing assembly, in accordance with particular embodiments.

FIG. 5 is another partial perspective view of components of a manufacturing assembly, in accordance with particular embodiments. Wheel manufacturing assembly 400 of FIG. 5 is similar to wheel manufacturing assemblies 10, 100, 200, and 300 of FIGS. 1, 2, 3, and 4, respectively, but includes riser portions 410, riser sleeves 412, and breaker cores 420.

Riser sleeves 412 insulate riser portions 410 that are formed from solidification of the molten alloy after it flows out through the casting cavity and back up through riser sleeves 412. Riser portions 410 may solidify after solidification of the adjacent cavity flange portion, which assists in reducing porosity in the wheel flange portion of the cast wheel by providing molten alloy to the cavity flange portion as it solidifies. In the illustrated embodiment, placement of riser sleeves 412 occurs adjacent the cavity flange portion along the circumference of the cavity plate portion. This configuration may allow for more even distribution of the molten alloy during solidification and may increase the likelihood of avoiding casting irregularities in sections of the wheel flange portion. Other embodiments may use one or more riser sleeves 412 in alternative configurations.

Breaker cores 420 are located at the base of riser sleeves 412 and riser portions 410, adjacent to the cavity flange portion and cavity plate portion of the wheel cavity. In particular embodiments, breaker cores 420 comprise resin-cured sand, such as a 3-part resin cured sand comprising silica sand made through a phenolic urethane process. A breaker core reduces the diameter of a riser portion at the place where it attaches to the cast wheel. The riser portion can be removed by being struck with a hammer or other instrument, causing the breaker core and adjacent riser to fall away leaving an alloy nub. Alloy nubs left after the removal of breaker cores 420 and riser portions 410 can be machined away in the manufacturing process to complete the wheel. Removing an alloy nub may require less machining than a full-diameter riser and may help maintain the contours of the wheel plate portion of the cast wheel. Various embodiments may use any suitable number of breaker cores in conjunction with all or some of an assembly's risers, arranged in any suitable configuration.

Figure 6:
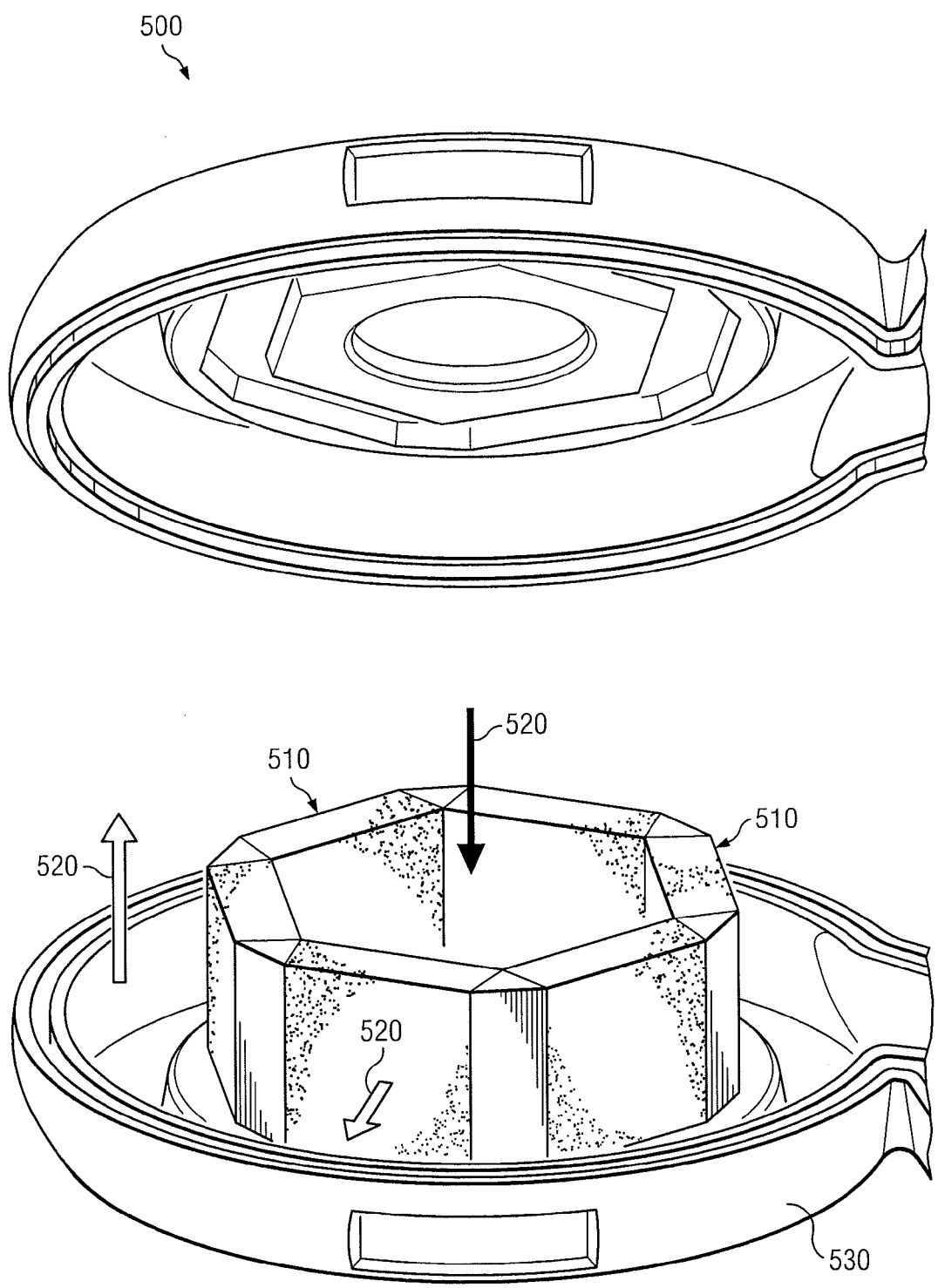
FIG. 6 is a perspective view of a filtration system of a wheel manufacturing assembly, in accordance with particular embodiments.

FIG. 6 is a perspective view of a filtration system of a wheel manufacturing assembly, in accordance with particular embodiments. Filtration system 500 of FIG. 6 may be used as filters described herein with respect to various embodiments, such as filters 320 of FIG. 4. Filtration system 500 includes filters 510 and carousel 530. Molten alloy enters filtration system 500 in the interior carousel space created between filters 510, passes through the filters, and then enters the wheel casting cavity as depicted by arrows 520. Filtration system 500 helps to reduce inclusions carried by the molten alloy and to promote laminar flow of the alloy before it enters the casting cavity. In some embodiments, the filtration system may comprise more or less filters, and the filters may be configured to create an interior space of any suitable shape. Various embodiments may utilize one or more filtration systems, and the one or more filtration systems may be oriented in any suitable position with respect to the wheel casting cavity. In some embodiments, similar filtration systems may be used without an outer carousel, and in other embodiments other types of carousels may be used.

In various embodiments, a casting cavity can be oriented in the cope and drag molds such that the wheel plate cavity is either convex or concave with respect to the cope mold. The illustrated embodiment utilizes a casting cavity concave to the cope mold. In this embodiment riser sleeves 412 are positioned in the cope mold adjacent the cavity plate portion and cavity flange portion such that riser portions 410 will form along the wheel plate portion of the wheel, adjacent the wheel flange portion of the wheel. The curvature of the cavity plate portion in the cope mold in the illustrated embodiment facilitates the formation of riser portions 410 adjacent the concave side of the cavity plate portion of the wheel cavity. Other embodiments may use other placements.

Although the present invention has been described in detail with reference to particular embodiments, it should be understood that various other changes, substitutions, and alterations may be made hereto without departing from the spirit and scope of the present invention. For example, although particular embodiments of the disclosure have been described with reference to a number of elements included within a wheel manufacturing assembly, these elements may be combined, rearranged or positioned in order to accommodate particular casting requirements or needs. For instance, the wheel cavity portions may be configured differently within the mold, and the casting cavity may be oriented in either a concave or convex manner or in any other advantageous manner within the mold. In particular embodiments, the molten alloy may enter the casting cavity via a sprue positioned within a core component, a sprue configured with a gating system comprising any number of ingates in any suitable configuration, or via an alternative arrangement, and may enter from any direction within the cope and drag molds. In various embodiments, the cope and drag molds may be configured of green sand or other material. The mold may include a chill component, which may comprise steel, graphite, other metals or alloys, or other material and which may provide desired directional solidification in the wheel cavity. Additionally, in some embodiments, insulators may be utilized adjacent to any portion of the wheel cavity or wheel manufacturing assembly to assist in controlling temperatures during solidification. In particular embodiments, risers may be positioned adjacent to any portion of the wheel cavity or wheel manufacturing assembly and arranged in any configuration to provide molten alloy to the wheel cavity as the cast wheel solidifies. Riser breaker cores may also be employed adjacent to any number of risers so as to reduce the diameter of the attachment point between a riser and the cast wheel. In some embodiments, one or more filters may be positioned within the cope or drag molds to reduce inclusions in the molten alloy before it enters the casting cavity. A tile basin may also be configured so as to reduce inclusions in the molten alloy. In particular embodiments, filters and a tile basin may be used together. Additionally, in some embodiments the tile basin may be positioned within the casting mold to reduce turbulence in the casting cavity. In particular embodiments, filters may also be arranged in any quantity and in any configuration to reduce turbulence in the molten alloy. In some embodiments, a tile basin and one or more filters may be used jointly to assist in reducing turbulence and maintaining laminar flow.

Various embodiments contemplate great flexibility in the arrangement of the wheel manufacturing assembly and its components. Additionally, while some embodiments are described with respect to manufacturing railcar wheels, particular embodiments may be used to manufacture other types of cast wheels.

What is claimed is:
1. A wheel manufacturing system, comprising:
a cope mold portion comprising internal cope mold walls;
a drag mold portion comprising internal drag mold walls;

the internal cope mold walls and internal drag mold walls defining at least in part perimeter boundaries of a wheel cavity, the wheel cavity comprising:
- a cavity center portion configured to form a wheel center portion of a wheel after solidification of a molten alloy in the cavity center portion;
- a cavity plate portion configured to form a wheel plate portion of the wheel after solidification of a molten alloy in the cavity plate portion; and
- a cavity flange portion configured to form a wheel flange portion of the wheel after solidification of a molten alloy in the cavity flange portion;

a central core component positioned within the cope mold portion and the drag mold portion, the central core component configured to define a central cylindrical hole in the wheel after solidification of the molten alloy;

a sprue positioned within the central core component, the sprue configured to receive molten alloy for flowing downward through the sprue before entering the wheel cavity; and the central core component including a bottom opening that opens into the drag mold portion, the bottom opening being entirely below the wheel cavity such that the central core component is configured to receive molten alloy after flowing downward from the sprue and exit the central core component below the wheel cavity through the bottom opening.

2. The system of claim 1, wherein the cope mold portion and the drag mold portion comprise green sand.

3. The system of claim 1, further comprising a gating section comprising one or more ingates configured to receive the molten alloy after flowing downward through the bottom opening of the sprue and direct the molten alloy upward into the wheel cavity.

4. The system of claim 1, further comprising an insulation sleeve adjacent the cavity plate portion.

5. The system of claim 1, further comprising a tile basin positioned within the drag mold portion adjacent the cavity center portion.

6. The system of claim 5, further comprising at least one filter positioned within the tile basin, the at least one filter configured to reduce inclusions in the molten alloy before the molten alloy enters the cavity center portion.

7. The system of claim 1, further comprising at least one filter positioned in the drag mold portion, the at least one filter configured to reduce inclusions in the molten alloy before the molten alloy enters the cavity center portion.

8. The system of claim 1, further comprising:
- at least one riser breaker core positioned adjacent the cavity flange portion; and
- a riser sleeve positioned adjacent each of the at least one riser breaker cores, each riser sleeve configured to insulate a respective riser portion adjacent the cavity flange portion of the wheel cavity.

9. The system of claim 1, comprising a chill component positioned within the wheel cavity adjacent the cavity flange portion, the chill component configured to provide directional solidification from the cavity flange portion toward the cavity plate portion of molten alloy in the wheel cavity.

10. The system of claim 9, wherein the chill component comprises graphite.

11. The system of claim 1, wherein the central core component is configured to receive molten alloy flowing downward from the sprue such that the molten alloy flows through the central core component and below the wheel cavity before exiting the central core component and entering the wheel cavity.

* * * * *